United States Patent
Gagliardi, Jr.

[11] Patent Number: 6,017,570
[45] Date of Patent: Jan. 25, 2000

[54] METHOD OF PREPARING A RESTRUCTURED MEAT PRODUCT USING SHEETS OF MEAT OBTAINED FROM PASSING MEAT THROUGH A SLOTTED FOOD GRINDER PLATE

[75] Inventor: Eugene D. Gagliardi, Jr., Atglen, Pa.

[73] Assignee: Visionary Design, Inc., Atglen, Pa.

[21] Appl. No.: 09/024,047

[22] Filed: Feb. 16, 1998

Related U.S. Application Data

[62] Division of application No. 08/611,913, Mar. 6, 1996, Pat. No. 5,765,768.

[51] Int. Cl.⁷ ..................................................... A23L 1/314
[52] U.S. Cl. ........................... 426/513; 426/516; 426/518; 426/519
[58] Field of Search .................................... 426/513, 518, 426/519, 516

[56] References Cited

U.S. PATENT DOCUMENTS

| | | | |
|---|---|---|---|
| 383,713 | 5/1888 | Deissler et al. | 241/82.5 |
| 970,593 | 9/1910 | Yeakel | 241/95 |
| 1,507,516 | 9/1924 | Richardson | 425/362 R |
| 1,647,196 | 11/1927 | Rollman . | |
| 2,685,825 | 8/1954 | Novak | 241/83 |
| 3,529,646 | 9/1970 | Pavia . | |
| 3,762,658 | 10/1973 | Barnes . | |
| 4,057,190 | 11/1977 | Kiwior et al. | 239/558 |
| 4,217,083 | 8/1980 | Machuque | 425/198 |
| 4,614,489 | 9/1986 | Juravic | 426/513 X |
| 4,699,325 | 10/1987 | Hess | 241/82.5 |
| 4,728,524 | 3/1988 | Gagliardi, Jr. | 426/272 |
| 5,026,572 | 6/1991 | Neiberger | 426/513 X |
| 5,251,829 | 10/1993 | Lesar | 241/30 |

FOREIGN PATENT DOCUMENTS

| | | |
|---|---|---|
| 402 217 | 10/1909 | France . |
| 3041 | 7/1900 | Germany . |
| 116582 | 9/1926 | Germany . |
| 575263 | 4/1933 | Germany . |
| 556569 | 4/1957 | Germany . |
| 24786 | of 1910 | United Kingdom . |

*Primary Examiner*—Arthur L. Corbin
*Attorney, Agent, or Firm*—Akin, Gump, Strauss, Hauer & Feld, L.L.P.

[57] ABSTRACT

A restructured meat product is prepared by passing the meat through a meat grinder having an outlet plate containing a plurality of spaced slot-like openings. Each of the openings has a predetermined width in the range of from one millimeter to six millimeters to provide meat sheets having a thickness corresponding to the width of the slot-like openings and having a substantial major surface area. The sheets of meat are then kneaded together in a tangled mass in a manner similar to kneading dough to cause the juices of the meat to exude from the meat sheets until the meat sheets begin to stick together by means of the juices. The tangled mass of meat sheets are formed into a restructured meat product. The restructured meat product is held together by the adhesive nature of the meat juices and the entanglement of the meat sheets. The restructured meat product has a substantially uniform consistency and tenderness and is substantially devoid of chunks or cubes.

6 Claims, 4 Drawing Sheets

METHOD OF PREPARING A RESTRUCTURED MEAT PRODUCT USING SHEETS OF MEAT OBTAINED FROM PASSING MEAT THROUGH A SLOTTED FOOD GRINDER PLATE

CROSS-REFERENCE TO RELATED APPLICATIONS

This application is a divisional of copending U.S. application Ser. No. 08/611,913 filed Mar. 6, 1996, now U.S. Pat. No. 5,765,768, the entire disclosure of which is incorporated herein by reference.

BACKGROUND OF THE INVENTION

The present invention relates to food processing and, more particularly, to a plate for use on the outlet end of a food grinder and a method of preparing a food product utilizing a food grinder with the plate thereon.

Food grinders, particularly meat grinders, are well known in the food preparation art and are used for the preparation of a variety of foods, particularly ground meat products such as ground beef, which may be used in the preparation of traditional dishes such as hamburgers, meatloaf, or the like. FIG. 1 is illustrative of a portion of a typical prior art rotary meat grinder 10 of the horizontal type used for the preparation of ground meat. The meat grinder 10 shown in FIG. 1 includes a generally cylindrical, generally horizontal casing or housing 12 within which is contained a rotatable meat-impelling auger 14. A knife 16 is secured to the leading end of the auger 14 and is positioned proximate the outlet end 18 of the housing 12. Covering the outlet end 18 of the housing 12 is a removable, generally circular outlet plate 20. The outlet plate 20 includes a plurality of spaced apart generally circular openings 22 (FIG. 2) extending completely therethrough and a generally outwardly extending hub portion 24. A generally tubular conduit 26 is secured around the hub portion and a generally cylindrical bore or passageway 28 extends through the center of the outlet plate 20. A suitable threaded ring 30 having an inwardly extending lip 32 is threadingly secured with the outer edge of the housing 12 proximate the outlet end 18 for holding the outlet plate 20 in place against an annular shoulder 34 within the housing 12. The outlet plate 20 includes a counterbore 36 on the interior surface to aid in the collection and removal of bone fragments, gristle, and other inedible components.

In operation of the meat grinder 10, meat, such as beef, veal, lamb, poultry, fowl, fish and other seafood, or the like, and/or other food products such as seasoning, fillers, vegetables, or the like, are installed into the grinder 10 through a suitable inlet hopper (not shown). Rotation of the auger 14 either manually or by way of a suitably coupled motor or other such drive device (not shown) results in the meat and/or other food products moving from the inlet toward the outlet end 18 of the housing 12. As the meat and other food products flow along the housing, they reach the rotating knife 16 which cuts the meat and/or other food products. The pressure of the meat and/or other food products moving toward the outlet end 18 by the rotation of the auger 14 in combination with the cutting action of the knife 16 results in the cut meat and/or other food products being extruded through the openings 22 extending through the outlet plate 20. As best illustrated in FIG. 2, the extruded meat and/or other food products forms a series of generally continuous string-like sections which are collected and used as ground meat and/or other food products. The action of the auger 14 and the knife 16 results in small pieces of bone, gristle, or the like, being removed from the meat. The bone, gristle, and the like, are separated from the meat and flow toward the axial center of the housing 12 and into the counterbore 36 of the outlet plate 20 where they pass through the cylindrical opening 28 in the plate 20 and into the conduit 26 for appropriate disposal. Further details concerning the structure and operation of a typical prior art meat grinder may be obtained by reference to U.S. Pat. Nos. 1,647,196; 4,699,325; and 5,251,829, the disclosures of which are incorporated herein by reference.

The present invention constitutes an improvement to existing food grinders and, in particular, to existing meat grinders. The present invention comprises an outlet plate which is used as a replacement for the existing outlet plate 20 on a conventional food grinder. The outlet plate of the present invention, instead of having a plurality of generally circular, generally equally spaced openings extending therethrough, includes a plurality of slot-like openings extending therethrough. The slot-like openings may be elongated and generally parallel to each other, generally arcuate and concentric, or of some other shape and/or positioned in some other manner. The use of an outlet plate having slot-like openings results in the creation of generally elongated slice-like sheets of meat, seafood, or other food being extruded from the meat or food grinder. The size and shape of the meat, seafood, or food sheets depends upon the size and shape of the slot-like openings extending through the outlet plate. The sheet-like meat or food products resulting from the use of an outlet plate in accordance with the present invention are particularly well suited for use in the preparation of a restructured meat product.

BRIEF SUMMARY OF THE INVENTION

Briefly stated, the present invention comprises a plate for use on the outlet end of a food grinder. The plate comprises a generally cylindrical disk-like body portion having an axis, first and second generally parallel spaced principal surfaces extending generally perpendicular to the axis, and concentric inner and outer peripheral surfaces extending between the first and second principal surfaces. The plate further includes a plurality of generally spaced slot-like openings extending through the body portion from the first principal surface to the second principal surface. The slot-like openings are located in an annular area of the body portion extending between a first predetermined distance radially outwardly from the inner peripheral surface and a second predetermined distance radially inwardly from the outer peripheral surface. The slot-like openings each have a predetermined width for the discharge of food therethrough when the plate is secured to the outlet end of a food grinder. In one embodiment, the slot-like openings are elongated and generally parallel to each other. In another embodiment, the slot-like openings are generally arcuate and concentric.

The present invention further comprises a method of preparing a restructured meat product of substantially uniform consistency and tenderness and substantially devoid of chunks or cubes. The method comprises the steps of passing the meat through a meat grinder having an outlet plate containing a plurality of spaced slot-like openings with each opening having a predetermined width in the range of from one to six millimeters to provide elongated meat sheets having a thickness generally corresponding to the width of the slot-like openings and having a substantial major surface area. The sheets of meat are kneaded together in a tangled mass to cause the juice of the meat to exude from the meat sheets until the meat sheets begin to stick together by means of the juices. The kneading step comprises working of the meat sheet mass in a manner which simulates the kneading of dough. The tangled mass of meat sheets is then formed into a restructured meat product, the restructured meat product being held together by the adhesive nature of the meat juices and the entanglement of the meat sheets.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred, it being understood, however, that the invention is not limited to the specific methods and instrumentalities disclosed. In the drawings.

DETAILED DESCRIPTION OF THE INVENTION

Figure 3:
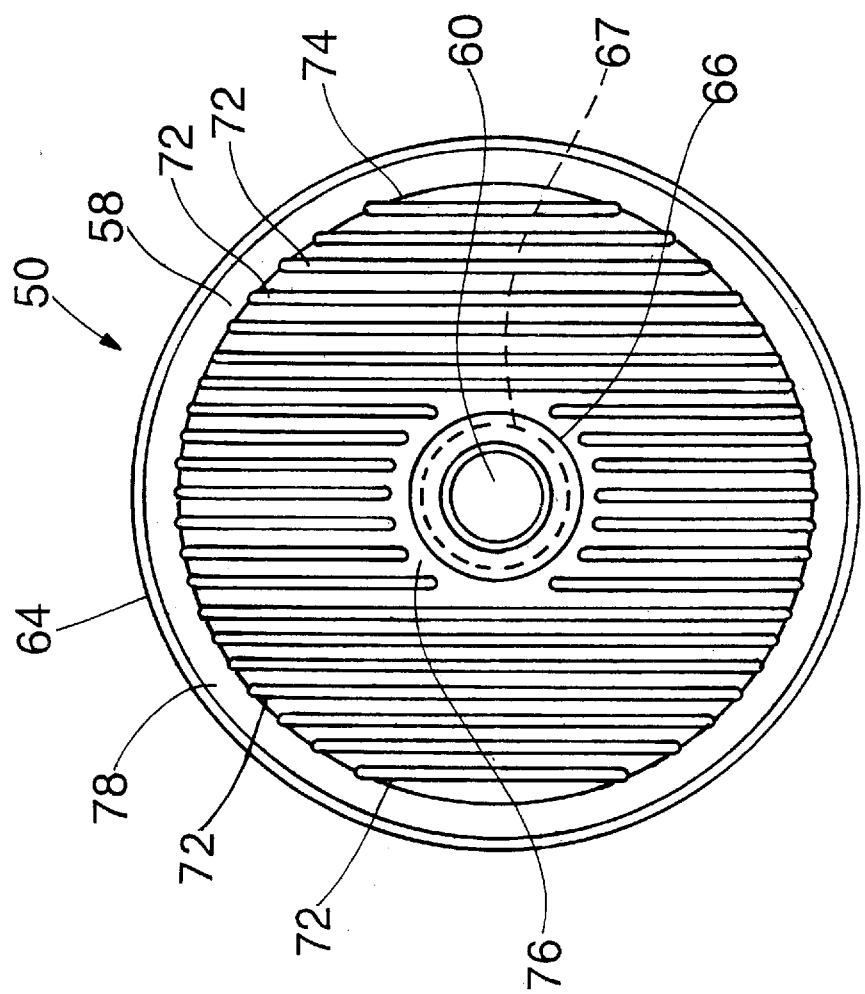
FIG. 3 is a front elevational view of an outlet plate for a food grinder in accordance with a first embodiment of the present invention.
Figure 4:
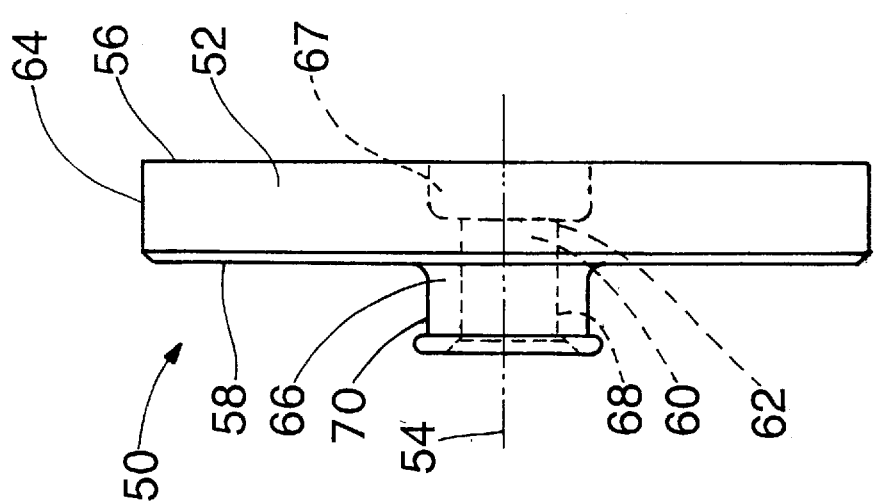
FIG. 4 is a side elevational view of the outlet plate shown in FIG. 3.

Referring to the drawings wherein the same reference numerals are used to indicate the same components throughout the several figures, there is shown in FIGS. 3 and 4 a first preferred embodiment of an outlet plate 50 in accordance with the present invention. The outlet plate 50 is for the purpose of replacing a traditional or prior art outlet plate 20 employed on a typical or standard food grinder apparatus such as the meat grinder 10 illustrated in FIG. 1. Accordingly, the overall size, shape, and structure of the outlet plate 50 in accordance with the present embodiment may vary but is similar to that of the prior art outlet plate 20 with the exception of the size, shape, and location of the openings through which the food or meat is extruded.

Figure 5:
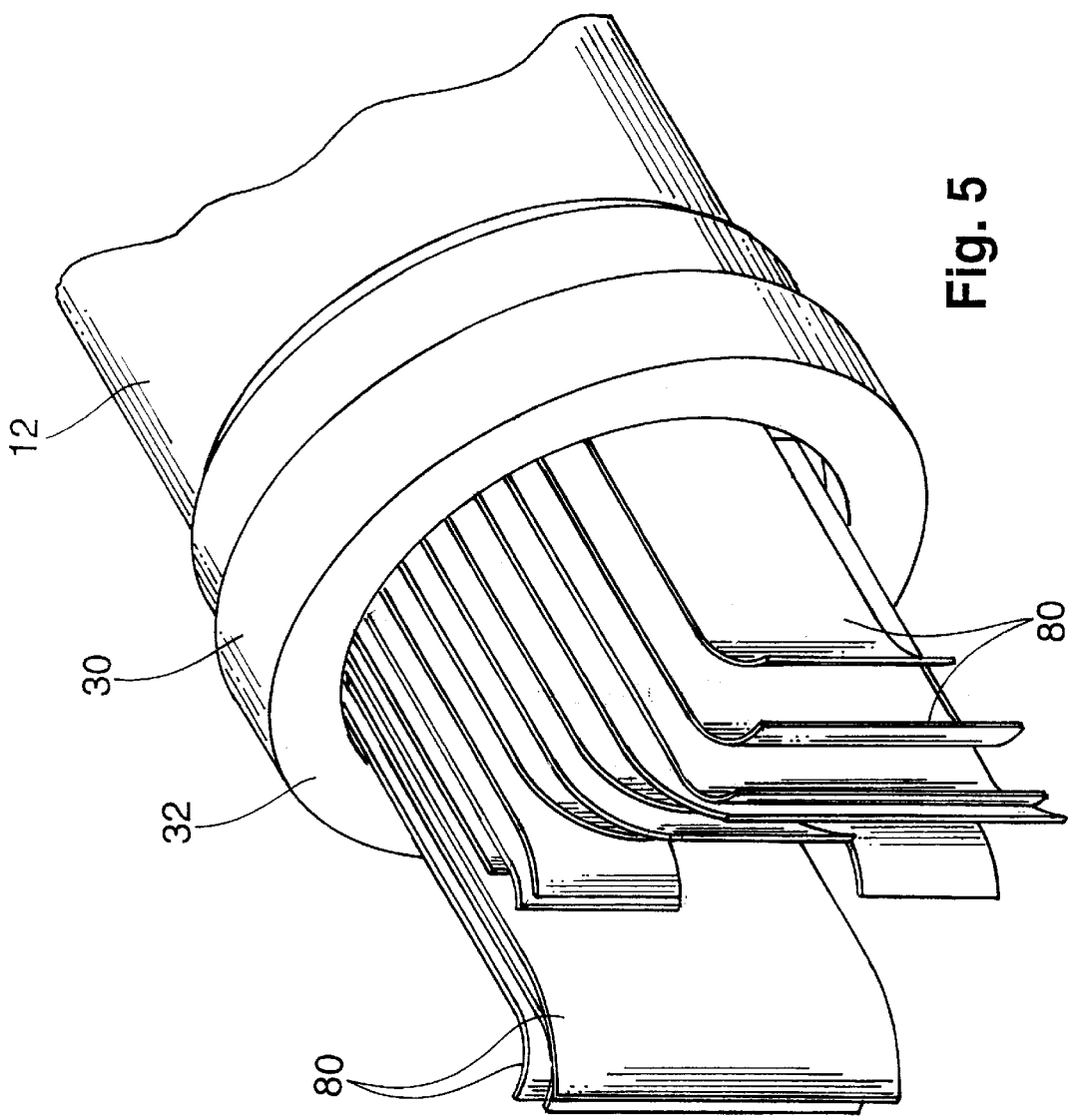
FIG. 5 is a perspective view of the outlet plate of FIG. 3 installed on a food grinder and showing sheets of food being extruded therefrom.

Referring to FIGS. 3–5, the outlet plate 50 is comprised of a generally cylindrical disk-like body portion 52 having an axis 54 and first and second generally parallel, spaced principal surfaces 56, 58. The first and second principal surfaces 56, 58 are generally perpendicular to the axis 54 and are spaced apart by the thickness of the plate 50. Preferably, the plate 50 has a thickness generally corresponding to the thickness of the prior or existing outlet plate 20 of the food grinder with which the outlet plate 50 will be used. However, it will be appreciated by those skilled in the art that the thickness of the plate 50 in accordance with the present embodiment may vary depending upon the particular food or meat grinder with which the plate 50 is to be employed, the material from which the plate 50 is made, and other factors which will be apparent to those of ordinary skill in the art. Preferably, the plate 50 of the present embodiment is made of a high strength, lightweight material such as heat-treated steel, stainless steel, or some other suitable steel alloy. It will also be apparent to those of ordinary skill in the art that other suitable materials, such as some other metal or metal alloy or a polymeric material, may be employed for producing an outlet plate 50 used in some applications.

As best shown in FIGS. 3 and 4, the plate 50 of the present embodiment includes a generally circular opening 60 extending through the axial center thereof. The opening 60 establishes an inner peripheral surface 62 extending between the first and second principal surfaces 56, 58. The body portion 52 also includes a generally circular concentric outer peripheral surface 64 also extending between the first and second principal surfaces 56, 58.

The plate 50 further includes an integral generally cylindrical hub portion 66 generally coaxial with and projecting from the second principal surface 58 of the body portion 52. The hub portion 66 includes generally concentric inner and outer peripheral surfaces 68, 70. The inner peripheral hub surface 68 is generally coextensive with the inner peripheral surface 62 of the body portion 52. The outer peripheral hub surface 70 has a diameter substantially less than the diameter of the outer peripheral surface 64 of the body portion 52.

The hub portion 66 functions in the same manner as the hub portion 24 of the prior art plate 20 to facilitate connection of a conduit 26 for the removal of bone pieces, gristle, and the like. A counterbore 67 is provided in the first principal surface 56 of the body portion 52 to assist in the removal of such unwanted components in a manner well known in the art. It will be appreciated by those of ordinary skill in the art that not all food or meat grinders include such a feature. Accordingly, it should be understood that the present invention is not limited to a plate 50 which includes a hub portion 66 and/or a counterbore 67. Instead, the plate 50 may be comprised of substantially only the body portion 52 for use with food or meat grinders that do not include such a bone or gristle removing feature.

The plate 50, in accordance with the present embodiment, further includes a plurality of generally parallel, generally equally spaced slot-like openings 72 extending through the body portion 52 from the first principal surface 56 to the second principal surface 58. As best shown in FIG. 3, the slot-like openings are provided in an annular area 74 of the body portion 52 extending radially between a first predetermined distance 76 radially outwardly from the inner peripheral surface 62 and a second predetermined distance 78 extending radially inwardly from the outer peripheral surface 64 of the body portion 52. In the present embodiment, the slot-like openings 72 are generally elongated and generally parallel to each other. Preferably, the generally parallel slot-like openings 72 are generally equally spaced apart and are of a predetermined width which, preferably, is the same for all of the slot-like openings 72. The predetermined width of the slot-like openings 72 may vary from a minimum width of approximately one millimeter to a maximum width of approximately eight millimeters depending upon the particular application. Those of ordinary skill in the art will understand that the width of the slot-like openings 72 may be greater or lesser than the foregoing dimensions and that the width of each of the slot-like openings 72 may not be the same. Preferably, the slot-like openings are sized to reject bone, gristle, and other undesirable components. It will also be appreciated by those of ordinary skill in the art that the number of slot-like openings 72 and the spacing between the slot-like openings 72 may vary and that for some applications the slot-like openings 72 may not extend over the entirety of the annular area 74. Preferably, the walls of the slot-like openings 72 are uniform and extend generally parallel to the axis 54. However, if desired, the slot-like openings 72 may be tapered so that the width of the slot-like openings 72 on one principal surface of the body portion 52 may be greater than the width of the slot-like openings 72 on the other principal surface of the body portion 52.

As shown in FIG. 3, in the present embodiment, the length of the slot-like openings 72 varies in accordance with the location within the annular area 74 of each individual slot-like opening 72. Preferably, the peripheral ends of each of the slot-like openings 72 are generally curved to facilitate ease of manufacture of the outlet plate 50.

Figure 1:
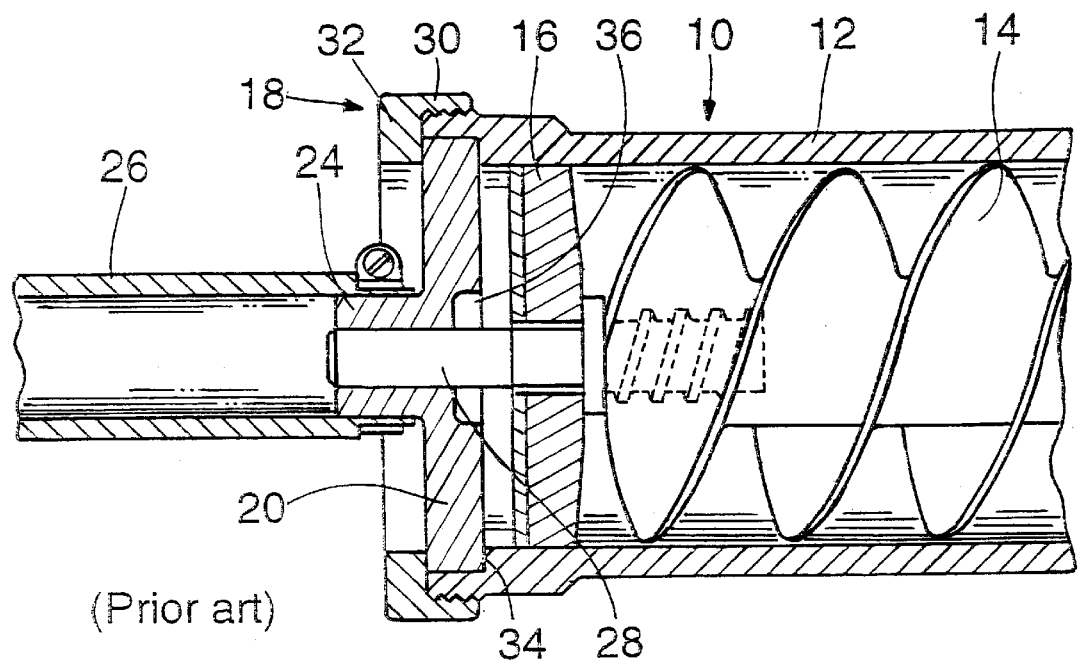
FIG. 1 is a sectional elevational view of a portion of a typical prior art food grinder of the type with which the present invention may be employed.
Figure 2:
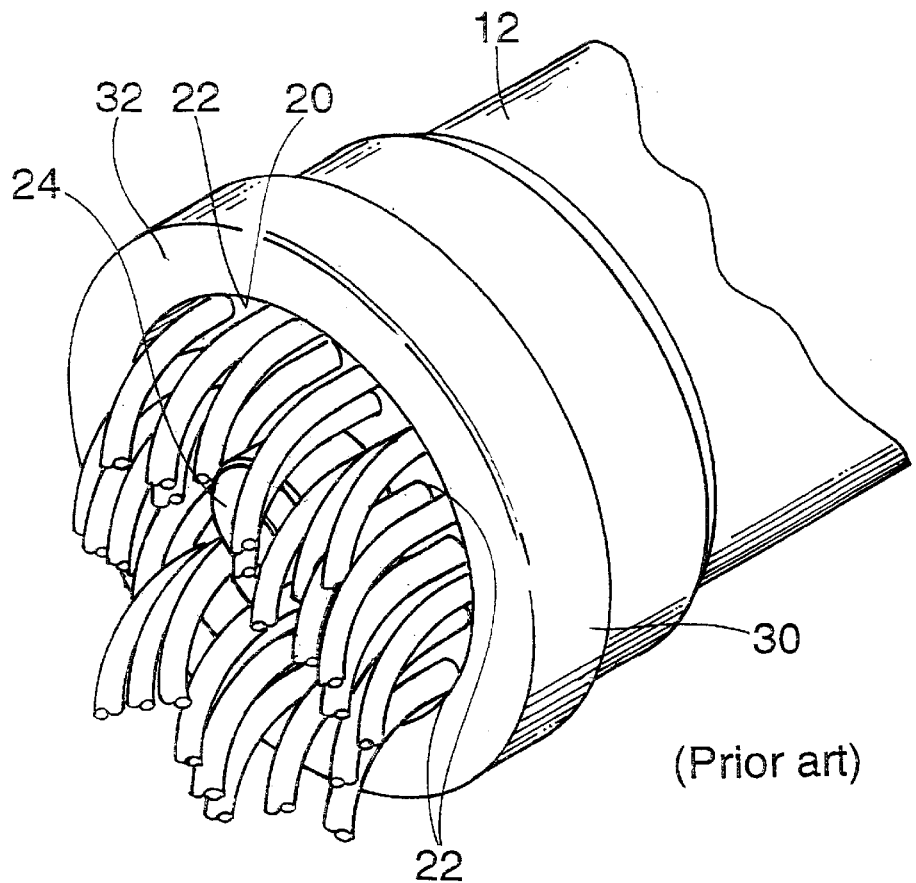
FIG. 2 is a perspective view of a portion of the prior art food grinder of FIG. 1 illustrating the manner in which a food product is extruded from the outlet plate.

The outlet plate 50 may be installed on any suitable prior art food or meat grinder such as is illustrated in FIG. 1. Because the outlet plate 50 in accordance with the present embodiment is the same general size and structure as the prior art outlet plate 20, the outlet plate 50 can be quickly and conveniently installed in place of the prior art plate 20. When the outlet plate 50 is installed at the outlet end 18 of a food or meat grinder 10, a food product, fish or other seafood, meat, poultry, fowl, or the like flows out of the grinder through the slot-like openings 72 in the form of generally elongated slice-like sheets 80 as shown in FIG. 5. As with the outlet plate 20, bone and bone fragments, gristle, or other undesirable components flow into the counterbore 67 through the circular opening 60 and into the conduit 26 for disposal. The thickness of the sheets 80 varies in accordance with the width of the slot-like openings 72. Similarly, the width of the sheets 80 varies depending upon the overall length of the individual slot-like openings 72. The sheets 80 are similar in form to a natural slice of meat, fish, poultry, fowl, or the like, but are more uniform in thickness and, therefore, the sheets 80 can have a number of uses. For example, the sheets 80 could be fried or grilled in a manner similar to the preparation of a "steak" sandwich. Preferably, the width of the slot-like openings 72 is selected depending upon the particular food or meat being employed. For example, if beef is the desired meat, then the width of the slot-like openings 72 may be relatively small whereas if the grinder is employed for grinding chicken or fish, then the width of the slot-like openings 72 may be larger. Although in the embodiment illustrated in FIG. 3, the slot-like openings 72 are shown as having a generally vertical orientation, it will be appreciated by those of ordinary skill in the art that the outlet plate 50 may be rotated about its axis 54 to vary the orientation of the slot-like openings 72. For example, if the outlet plate 50 is rotated ninety degrees from the position illustrated in FIG. 3, the slot-like openings 72 would be generally horizontally oriented.

Figure 6:
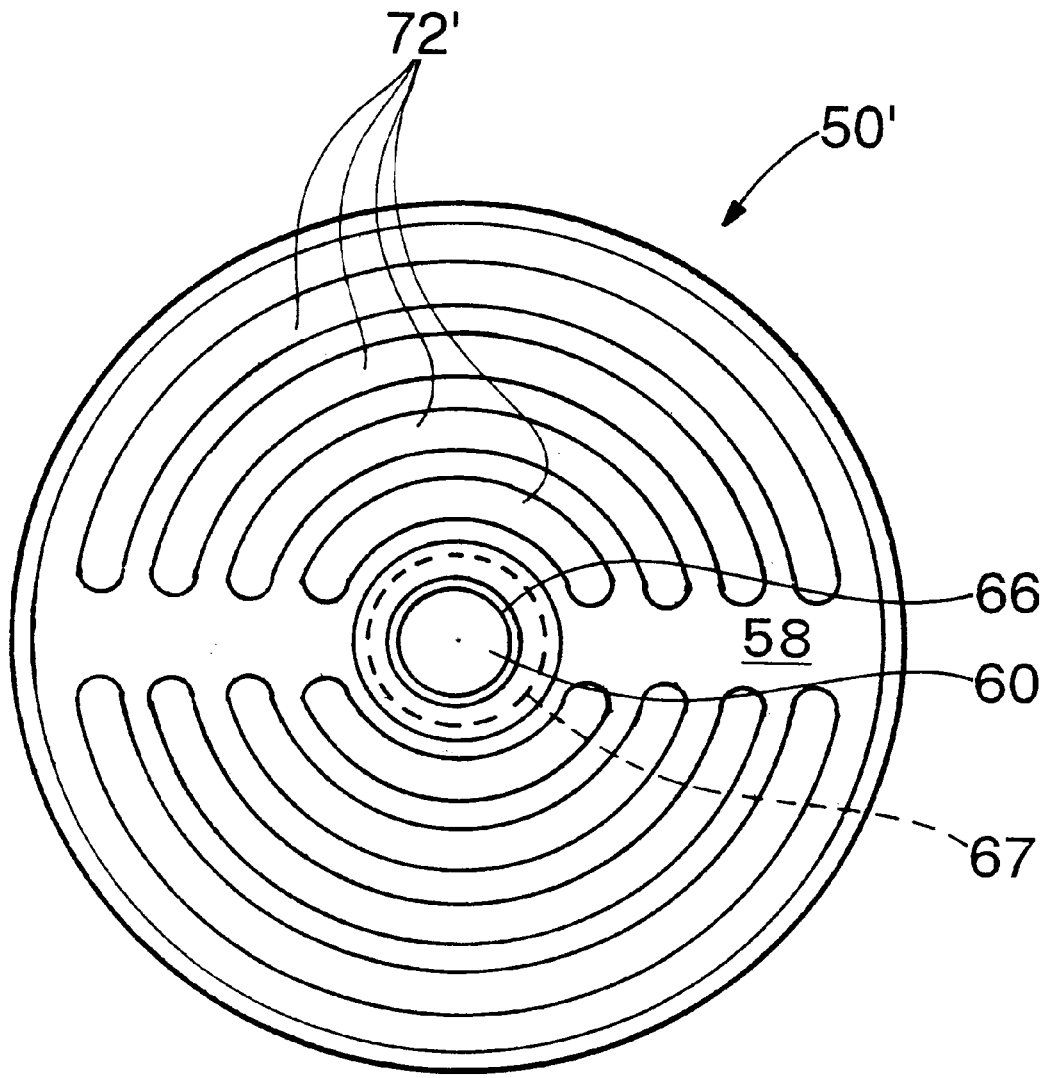
FIG. 6 is a front elevational view of a second embodiment of an outlet plate for a food grinder in accordance with the present invention.

FIG. 6 shows an outlet plate 50' in accordance with a second preferred embodiment of the invention. The outlet plate 50' has substantially the same structure as the outlet plate 50 of the above-described embodiment. However, the outlet plate 50' includes slot-like openings 72' which are generally concentric and generally arcuate in shape. The width, spacing, and substantially all other features of the slot-like openings 72' of the second embodiment are substantially the same as described above in connection with the first embodiment. However, as will be appreciated by those skilled in the art, the use of the outlet plate 50' in connection with a food or meat grinder results in food or meat sheets which are generally curved as opposed to the generally straight sheets 80 produced by the generally straight slot-like openings 72 of the first embodiment.

While the meat sheets formed by an outlet plate 50, 50' in accordance with the present invention have a variety of uses, they are particularly well suited for use in the preparation of a restructured meat product. U.S. U.S. Pat. No. 4,728,524, which is incorporated herein by reference, discloses details of a method for the preparation of a restructured meat product. The initial steps in forming the restructured meat product of the '524 patent involve cutting a meat product into thin slices having a thickness of about one to three millimeters and having a major surface area which varies considerably depending upon the meat type and other factors. Typically, the major surface of such meat slices is greater than ten square centimeters and preferably greater than about twenty square centimeters. The use of an outlet plate 50, 50' on a food or meat grinder 10 in accordance with the present invention results in the creation of relatively uniform slice-like meat sheets 80 which are highly suitable for use in connection with the preparation of a restructured meat product in accordance with the '524 patent. By utilizing such meat sheets 80, the initial, time-consuming step of carefully slicing the meat can be avoided. In this manner, a restructured meat product of substantially uniform consistency and tenderness and substantially devoid of chunks or cubes, may be formed by passing the meat through a meat grinder having an outlet plate 50 containing a plurality of spaced slot-like openings 72 wherein each of the openings has a length to width ratio of at least about 10:1 or at least about 20:1 and a predetermined width in the range of from one to six millimeters to provide meat sheets 80 having a thickness corresponding to the width of the sheet-like openings 72 and having a substantial major surface area. The meat sheets 80 may then be kneaded together in a tangled mass in accordance with the teachings of the '524 patent to cause the juices of the meat to exude from the meat sheets 80 until the meat sheets 80 begin to stick together by means of the juices. As discussed in the '524 patent, the kneading step comprises working of the meat sheets 80 in a manner which simulates the kneading of dough. Thereafter, the tangled mass of meat sheets 80 is formed into a restructured meat product of the type described in the '524 patent. The restructured meat product is held together by the adhesive nature of the meat juices and the entanglement of the meat sheets 80. The restructured meat product thus formed is made without the addition of salt, phosphates, or enzymes to the meat prior to or during the kneading and forming process.

From the foregoing description, it can be seen that the present invention comprises an outlet plate for use in connection with a food or meat grinder and a meat product formed by using the outlet plate. It will be appreciated by those skilled in the art that changes or modifications could be made to the above-described embodiments without departing from the broad inventive concepts of the invention. It should be appreciated, therefore, that the present invention is not limited to the particular embodiments disclosed but is intended to cover all embodiments within the scope or spirit of the appended claims.

We claim:

1. A method of preparing a restructured meat product of substantially uniform consistency and tenderness and substantially devoid of chunks or cubes comprising the steps of:

passing the meat through a meat grinder having an outlet plate containing a plurality of spaced slot-like openings, each opening being elongated and having a predetermined width in the range of from one millimeter to six millimeters to provide meat sheets having a thickness corresponding to the width of the slot-like openings and having a substantial major surface area, at least some of the slot-like openings having a length to width ratio of at least about 10:1;

kneading the sheets of meat together in a tangled mass to cause the juices of the meat to exude from the meat sheets until the meat sheets begin to stick together by means of the juices, the kneading step comprising working of the meat mass in a manner which simulates the kneading of dough; and forming the tangled mass of meat sheets into a restructured meat product, the restructured meat product being held together by the adhesive nature of the meat juices and the entanglement of the meat sheets.

2. The method as recited in claim 1 wherein the meat grinding step includes passing the meat through a grinder having an outlet plate containing a plurality of spaced, slot-like openings, wherein all of the slot-like openings are generally parallel to each other.

3. The method as recited in claim 1 wherein the meat grinding step includes passing the meat through a grinder having an outlet plate containing a plurality of spaced, elongated slot-like openings, wherein the slot-like openings have a width from approximately one millimeter to approximately two millimeters.

4. The method as recited in claim 1 wherein the meat grinding step includes passing the meat through a grinder having an outlet plate containing a plurality of spaced, slot-like openings, each opening having a predetermined width in the range of from one millimeter to four millimeters.

5. The method as recited in claim 1 wherein the meat grinding step includes passing the meat through a grinder having an outlet plate containing a plurality of spaced, slot-like openings, wherein each of the slot-like openings are of the same predetermined width.

6. The method as recited in claim 1 wherein the meat grinding step includes passing the meat through a grinder having an outlet plate containing a plurality of spaced, slot-like openings, wherein the slot-like openings are generally equally spaced from each other.

* * * * *